(12) United States Patent
Patterson et al.

(10) Patent No.: US 8,442,748 B2
(45) Date of Patent: *May 14, 2013

(54) METHOD FOR STARTING AN ENGINE

(75) Inventors: Henry W. Patterson, Waterford, MI (US); Alex O'Connor Gibson, Ann Arbor, MI (US); David Oshinsky, Trenton, MI (US); Joseph Norman Ulrey, Dearborn, MI (US); Xiangying Liu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,876

(22) Filed: Jun. 4, 2012

(65) Prior Publication Data

US 2012/0245831 A1 Sep. 27, 2012

Related U.S. Application Data

(63) Continuation of application No. 13/155,297, filed on Jun. 7, 2011, now Pat. No. 8,195,380, which is a continuation of application No. 12/639,787, filed on Dec. 16, 2009, now Pat. No. 7,962,278.

(51) Int. Cl.
*F02N 11/00* (2006.01)

(52) U.S. Cl.
USPC .................................... 701/113; 123/179.3

(58) Field of Classification Search .................. 701/103, 701/110, 112, 113; 123/179.3, 179.4, 179.25, 123/179.28, 179.16, 179.17, 179.18
See application file for complete search history.

(56) References Cited

U.S. PATENT DOCUMENTS

| | | | |
|---|---|---|---|
| 6,737,759 B2 | 5/2004 | Osada et al. | |
| 6,752,111 B2 | 6/2004 | Osada et al. | |
| 7,066,128 B2 | 6/2006 | Satake et al. | |
| 7,096,840 B2 | 8/2006 | Asada et al. | |
| 7,233,856 B2 | 6/2007 | Yuya et al. | |
| 7,377,248 B2 | 5/2008 | Hokuto | |
| 7,546,199 B2 * | 6/2009 | Kato | 701/112 |
| 2002/0017260 A1 | 2/2002 | Saito et al. | |
| 2008/0127927 A1 | 6/2008 | Hirning et al. | |
| 2008/0162007 A1 | 7/2008 | Ishii et al. | |
| 2010/0180849 A1 | 7/2010 | Senda et al. | |

* cited by examiner

*Primary Examiner* — Hai Huynh
(74) *Attorney, Agent, or Firm* — Julia Voutyras; Alleman Hall McCoy Russell & Tuttle LLP

(57) ABSTRACT

A method for improving starting of an engine that may be repeatedly stopped and started is presented. In one embodiment, the method disengages a starter in response to a first predicted combustion in a cylinder of the engine. The method may reduce one-way clutch degradation of a starter. Further, the method may reduce current consumption during engine starting.

20 Claims, 4 Drawing Sheets

METHOD FOR STARTING AN ENGINE

CROSS REFERENCE TO RELATED APPLICATIONS

The present application is a continuation of U.S. patent application Ser. No. 13/155,297, filed Jun. 7, 2011, now U.S. Pat. No. 8,195,380, which is a continuation of U.S. patent application Ser. No. 12/639,787 filed Dec. 16, 2009, which is now U.S. Pat. No. 7,962,278, the entire contents of each of which are incorporated herein by reference for all purposes.

FIELD

The present description relates to a system for improving starting of an engine. The method may be particularly useful for engines that are often stopped and then restarted.

BACKGROUND AND SUMMARY

Vehicle manufacturers have realized that it may be desirable under some conditions to automatically start and stop an engine of a vehicle. Stopping the engine can reduce fuel consumption, especially when the vehicle is stopped for longer periods of time, in stop-and-go traffic for example. However, continuously stopping and starting an engine can increase starter degradation, current consumption, engine noise and vibration, and starter one-way clutch degradation.

The inventors herein have recognized the above-mentioned disadvantages and have developed a method for improving engine starting.

One embodiment of the present description includes a method for starting an engine, comprising: stopping the engine; predicting a first combustion cycle of a cylinder from engine stop in which an air-fuel mixture is combusted; engaging a starter; and disengaging said starter during the predicted first combustion cycle.

Engine starting can be improved by disengaging a starter at a predetermined position that may be related to the first cylinder to combust an air-fuel mixture since an engine stop. For example, a starter can engage the flywheel of an engine while the engine is stopped. Upon engagement of the starter to the flywheel, the starter can begin to rotate the engine crankshaft and cause pistons within the cylinders to reciprocate. Crankshaft rotation causes valves that control flow through cylinders to operate, and valve operation and piston movement may be related such that they define or establish cycles of engine cylinders. And since cylinder cycles may be uniquely related to engine position, it may be possible to predict in which cylinder a first combustion cycle will take place. In particular, an engine controller can predict a first combustion event since engine stop in a cylinder based on engine position and cylinder fueling data. Therefore, it is possible to predict when the engine will start so that a starter may be disengaged early during an engine start.

The present description may provide several advantages. Specifically, the approach may reduce starter degradation, current consumption, overrunning clutch degradation, and engine noise/vibration. Further, the method may provide these benefits without additional hardware.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
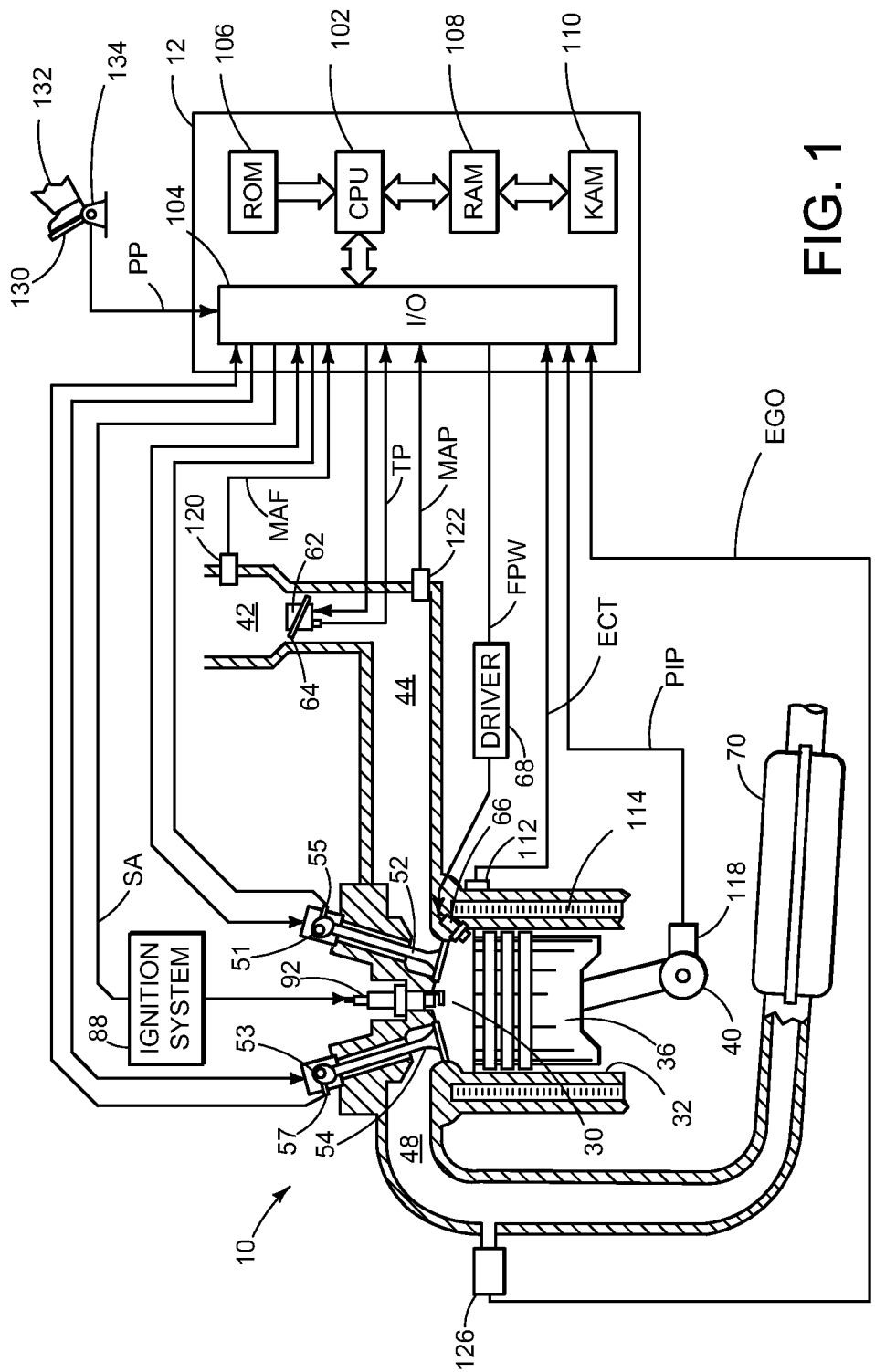
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 62. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

Figure 2:
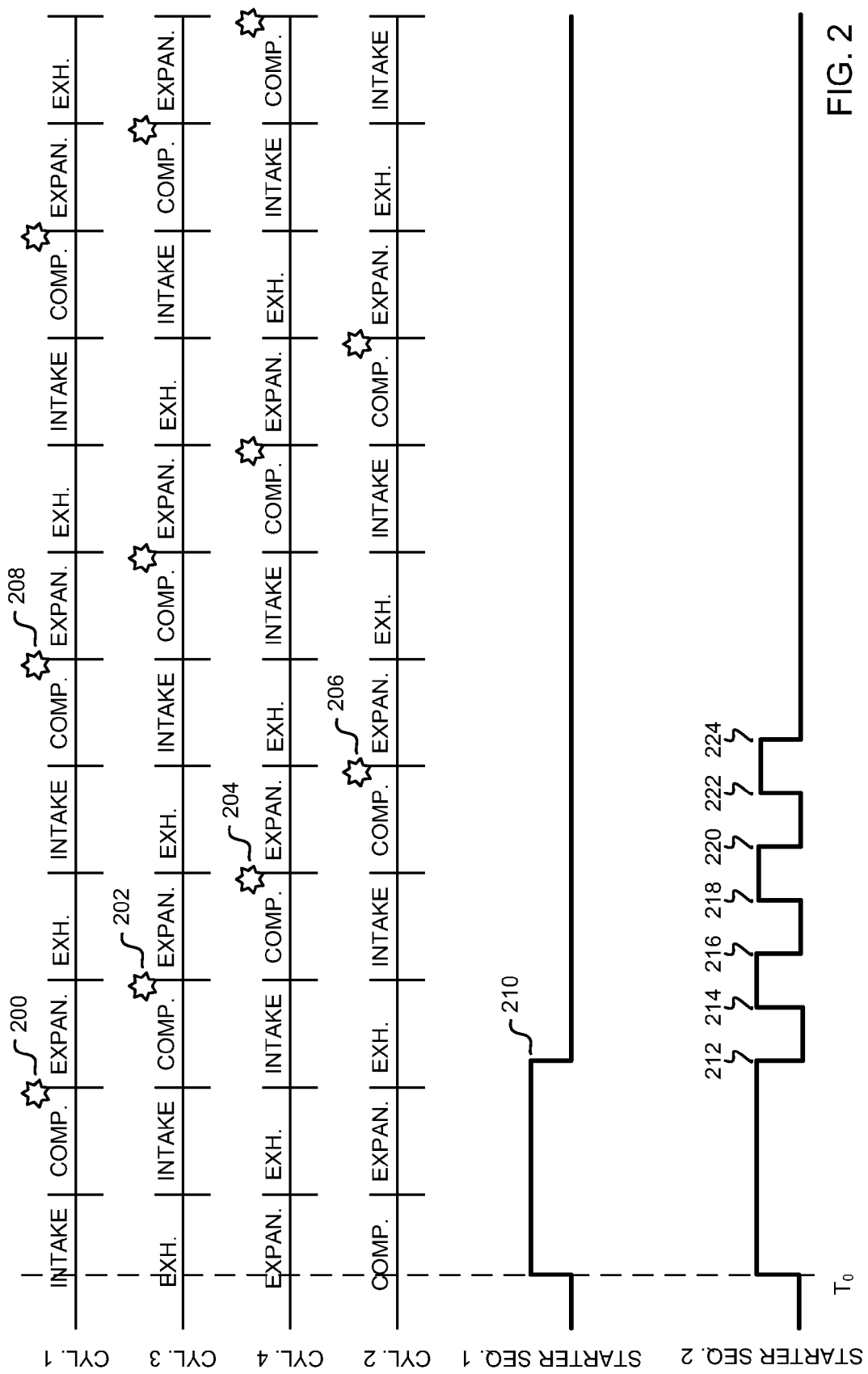
FIG. 2 is an example plot of a simulated engine start sequence.
Figure 4:
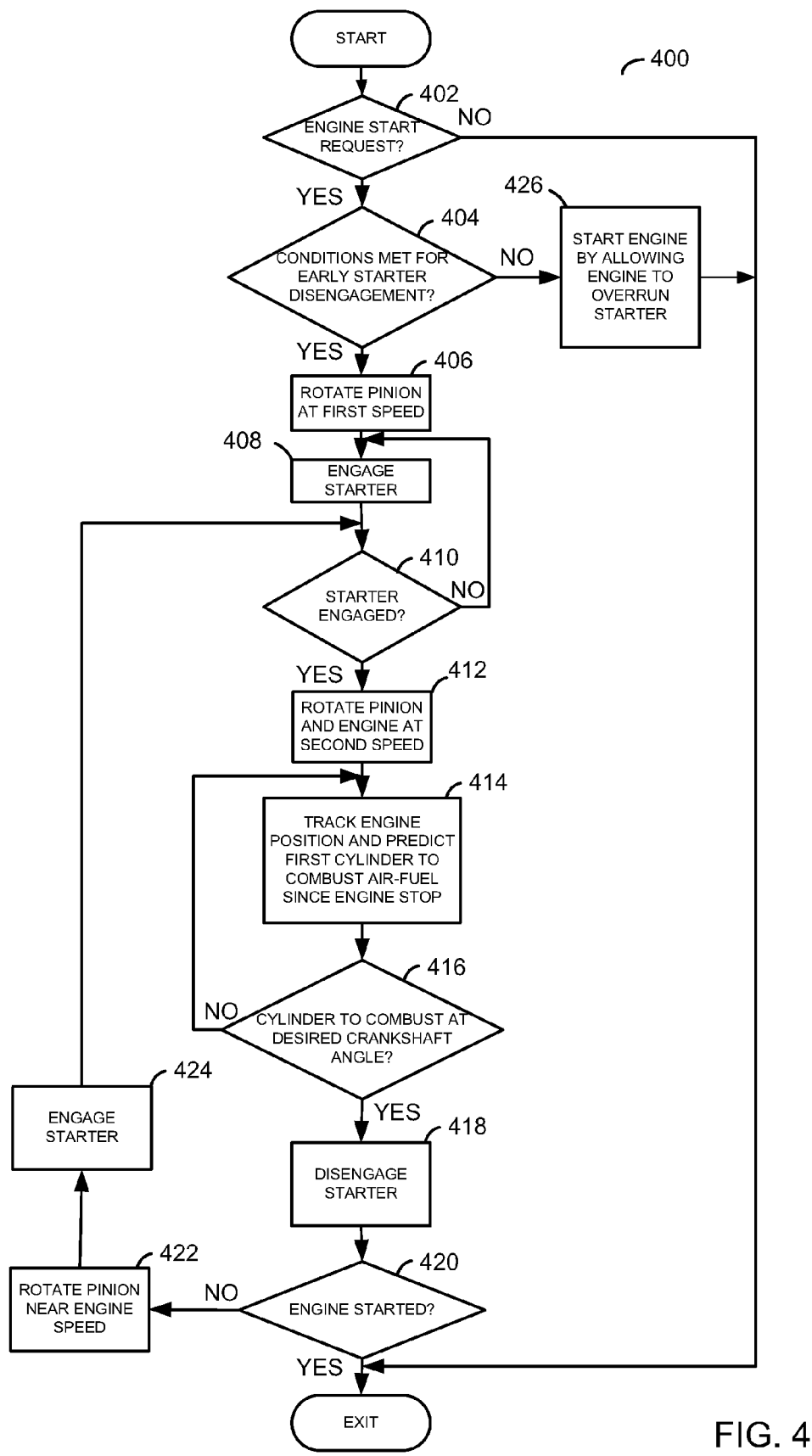
FIG. 4 is a flow chart of an engine starting routine.

Referring to FIG. 2, an example plot of a simulated engine start sequence by the method of FIG. 4 is shown. Time begins on the left side of the plot and increases to the right side of the plot. The illustrated sequence represents a start of a non-limiting four cylinder four cycle engine. In this example, the vertical markers represent top-dead-center or bottom-dead-center for the respective cylinder strokes. And, there are 180° crankshaft degrees between each vertical marker.

The first plot from the top of the figure represents position of cylinder number one. And, in particular, the stroke of cylinder number one as the engine crankshaft is rotated. To the left of $T_0$, the engine is stopped or at rest. At $T_0$, the engine crankshaft begins to rotate from torque provided by a starter motor. Cylinder number one strokes are labeled according to the engine position the engine assumed at engine stop. For example, cylinder number one was on an intake stroke at engine stop before time $T_0$. After $T_0$, the engine rotates and cylinder number one enters the compression stroke followed by expansion and exhaust strokes. The cylinder cycle for cylinder number one then repeats. For a four stroke engine a cylinder cycle may be 720°, the same crankshaft interval for a complete cycle of the engine. The star at label 200 indicates the first ignition event for the first combustion event since engine stop. Star 208 represents the second combustion event for cylinder number one after engine stop and the fifth combustion event since engine stop. The ignition may be initiated by a spark plug. In this sequence, cylinder number one valves are open for at least a portion of the intake stroke to provide air to the cylinder. Fuel may be injected the engine cylinders by port or direct injectors. The fuel and air mixture are compressed and ignited during the compression stroke. Peak cylinder pressure may occur at top-dead-center of compression stroke or during the expansion stoke.

It should be noted that engine position may be determined at the time of engine stop by tracking engine position as spark and fuel are deactivated. In one embodiment, when the engine is substantially stopped, engine position is determined and stored to memory for retrieval during the next engine start. In another embodiment, engine position may be determined at engine start after the engine begins to rotate by sensing camshaft and crankshaft positions.

The second cylinder position trace from the top of the figure represents the position and stroke for cylinder number three. Since the combustion order of this particular engine is 1-3-4-2, the second combustion event from engine stop is initiated at 202 as indicated by the star. Star 202 represents the initiation of the first combustion event for cylinder three after engine stop and the second combustion event from the engine stop.

The third cylinder position trace from the top of the figure represents the position and stroke for cylinder number four. Star 204 represents the initiation of the first combustion event for cylinder number four after engine stop and the third combustion event from the engine stop.

The fourth cylinder position trace from the top of the figure represents the position and stroke for cylinder number two. Star 206 represents the initiation of the first combustion event for cylinder number two after engine stop and the fourth combustion event from the engine stop.

It should be noted that the first cylinder to combust an air-fuel mixture can vary depending on the engine stopping position and the method of determining engine position. In some embodiments fuel may not be delivered to one or more engine cylinders until engine position is established. In other embodiments, fuel may be delivered before or as soon as the engine begins to rotate without regard to the engine stopping position.

The fourth plot from the top of the figure indicates control of starter engagement. During starter engagement, a solenoid moves a rotating pinion gear from a position away from an engine flywheel to a position where the pinion engages the flywheel and causes the engine crankshaft to rotate. In one embodiment, the pinion is initially rotated at a first low speed prior to engagement of the pinion to the flywheel. After the pinion engages the flywheel, the pinion speed is increased and the pinion remains engaged until the first cylinder predicted to combust an air-fuel mixture reaches a predetermined crankshaft position during the predicted first combustion cycle. In one example, the pinion is engaged until a crankshaft angle that corresponds to a position within the expansion stroke of the first cylinder cycle in which the first combustion event is initiated. In the illustrated example, the first combustion since engine start is initiated at 200, and the starter pinion is disengaged from the fly wheel at 210 during the expansion stroke of cylinder number one. Shortly thereafter, the first combustion event from engine stop is initiated.

In one example, the starter may be disengaged during the expansion stroke of the first cylinder to combust an air-fuel mixture and before spark is delivered to another engine cylinder. In this way, the starter can be disengaged at different crankshaft angles depending on the number of cylinders in the engine. For example, if spark advance for each cylinder of a four cylinder engine is timed at 10 crankshaft degrees before top-dead-center compression stroke, a starter may be disengaged in the expansion stroke of the first cylinder to combust an air-fuel mixture up to 10 crankshaft degrees before bottom-dead-center expansion stroke of the first cylinder to combust an air-fuel mixture. In this sequence there is 170 crankshaft degrees between top-dead-center compression stroke and when the starter is disengaged. On the other hand, for a six-cylinder engine, the starter may be disengaged up to 70 crankshaft degrees before bottom-dead-center expansion stroke of the first cylinder to combust an air-fuel mixture because the six-cylinder top-dead-center compression strokes are separated by 120 crankshaft degrees, rather than 180 crankshaft degrees as may be the case for a four cylinder engine.

Returning to FIG. 2, the fifth plot from the top represents a starter pinion engagement during an engine start where the engine does not accelerate as predicted. Before $T_0$, the engine is stopped and the crankshaft is at rest. In response to a request to start the engine, the starter pinion is rotated at a low speed and a solenoid engages the rotating pinion to the crankshaft at $T_0$. Thereafter, the engine crankshaft begins to rotate and the pinion speed is increased to a second higher speed. The pinion remains engaged until 212 at which time it is disengaged until 214 where it is reengaged. The pinion is again disengaged at 216 and is reengaged at 218. Further, the pinion is disengaged at 220 and is reengaged at 222. The starter is disengaged for a final time at 224. Each of the starter pinion engagements at 214, 218, and 222 correspond to engaging the engine flywheel with the starter pinion at a time before the next scheduled combustion event in the engine firing order. Each of the starter pinion disengagements at 216, 220, and 224 correspond to disengaging the starter pinion during the expansion stroke of the cylinder in which predicted combustion occurred.

The starter pinion is engaged and disengaged multiple times at 214-224. Further, the starter pinion may be reengaged in response to a number of conditions. For example, the starter pinion may be reengaged if engine speed does not reach a threshold or if a change in engine speed does not reach a threshold.

The starter pinion may be disengaged in response to a number of conditions. For example, the starter pinion may be disengaged when the crankshaft reaches a predetermined position corresponding to a crankshaft angle during the expansion or exhaust stroke of the cylinder in which combustion is predicted. In another example, the starter pinion may be disengaged when engine speed exceeds a threshold or when the engine acceleration exceeds a threshold during the expansion or exhaust stroke of the cylinder in which combustion is predicted.

In another example not shown, the starter may be initially engaged and then disengaged after a predicted combustion event is expected to occur. In particular, the starter can be disengaged during the expansion or exhaust stroke of the first cylinder to combust an air-fuel mixture after an engine stop. If the engine does not accelerate as predicted, the starter can be reengaged until engine speed overruns the overrunning clutch of the starter. Thus, in this example, the starter pinion is not held until a predetermined engine crankshaft angle. Rather, the starter pinion may be held engaged to the flywheel until the engine speed reaches a threshold.

Figure 3:
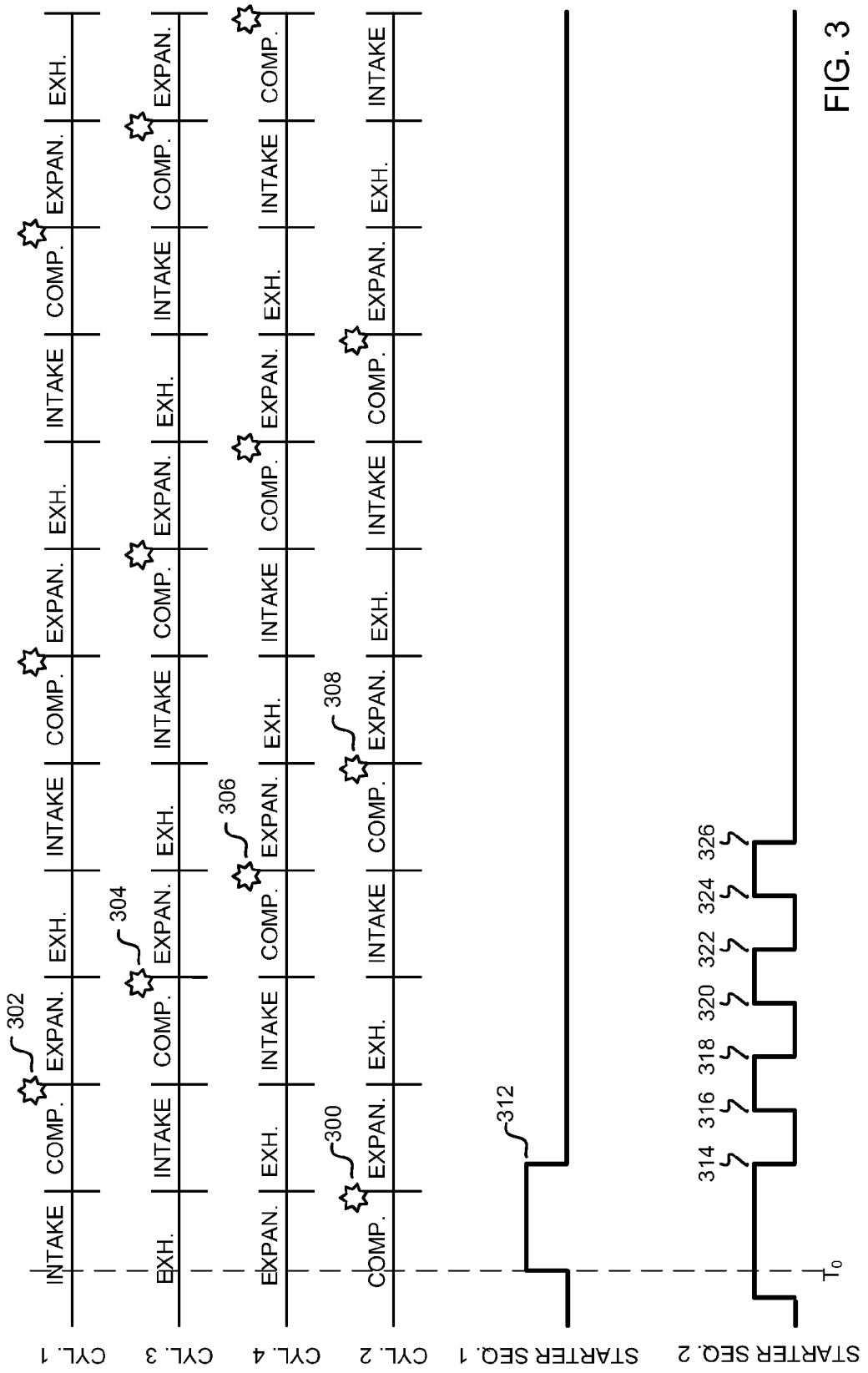
FIG. 3 is an example plot of an alternative engine start sequence.

Turning now to FIG. 3, an example plot of an alternative engine start sequence by the method of FIG. 4 is shown. Similar to FIG. 2, time begins on the left side of the plot and increases to the right side of the plot. This illustrated sequence also represents a start of a non-limiting four cylinder four cycle engine. Again, the vertical markers represent top-dead-center or bottom-dead-center for the respective cylinder strokes, and there are 180° crankshaft degrees between each vertical marker.

The description of cylinder traces 1-4 is identical to that of FIG. 2, with the exception of combustion events. Therefore, for the sake of brevity, the description of FIG. 2 is carried over to FIG. 3 and repetition of identical features is omitted. In FIG. 3 cylinder number two is the first cylinder to combust an air-fuel mixture since engine stop. Combustion is initiated in cylinder number two by a spark at 300. The combustion event at 300 may occur earlier than the combustion event at 302 (the first combustion event illustrated in FIG. 2) for several reasons. In one example, cylinder number two captures air in the cylinder after exhausting gases and inducting air during an intake stroke while the engine is being stopped. In response to a request to restart the engine, fuel is directly injected into the cylinder and combustion is initiated during the first compression stroke of cylinder number two. In this way, the engine may be started with less crankshaft rotation.

In another example, cylinder number two may be started early when an air-fuel mixture is trapped in a cylinder during an engine stop. For example, an engine controller can deactivated fuel and spark in response to an engine stop request and then briefly reactivate fuel when engine speed is low so that an air-fuel mixture may be trapped in the cylinder when the engine is stopped. Then, in response to an engine start request, the starter can rotate the engine and a spark at 300 can initiate combustion in cylinder number two so that cylinder number two may be the first cylinder to combust an air-fuel mixture since engine stop.

In both the above examples, cylinder number two can be predicted as a first combustion cycle of cylinder number two and as the first cylinder to combust an air-fuel mixture since engine stop. By controlling injection timing so that fuel is injected to a cylinder on or advancing to a compression stroke, the first combustion event of a cylinder may be predicted. In the example of Fig., cylinder number two is on its compression stroke and is therefore the first engine cylinder predicted to combust an air-fuel mixture after an engine stop. In one example, the compression stroke of cylinder number two is determinable from sensing cam and crankshaft positions at $T_0$ and as the engine rotates. In another example, the engine stopping position may be retained in engine controller memory so that the engine position is known before an engine restart is requested.

Thus, FIG. 3 differs from FIG. 2 in that cylinder number two is the first cylinder since engine stop to combust an air-fuel mixture. Since cylinder number one is next in the firing order, it is the next cylinder to combust an air-fuel mixture at 302. Then, cylinder three combusts an air-fuel mixture at 304, cylinder number four combusts an air-fuel mixture at 306, and cylinder number two combusts an air-fuel mixture at 308. Thus, in this starting sequence cylinder number two is the first cylinder to combust an air-fuel mixture since engine stop, cylinder number one is the second cylinder to combust an air-fuel mixture since engine stop, cylinder number three is the third cylinder to combust and air-fuel mixture since engine stop, and cylinder number four is the fourth cylinder to combust an air-fuel mixture since engine stop. Note that combustion events 300-306 are the first combustion events from engine stop in the respective cylinders. Therefore, combustion events 300-306 are the first cylinder cycles for the respective cylinders in which the cylinders combust an air-fuel mixture.

Turning now to describe one starter control sequence illustrated as "STARTER SEQ. 1," the sequence is based on the engine positions illustrated by CYL 1-4 above the starter control sequence. The starter pinion may begin to rotate at a first low speed before $T_0$. At $T_0$, the starter is moved to the engine flywheel and increases speed to a second level. Since cylinder number two is in a compression stroke at engine stop, fuel is injected into cylinder two in response to an engine start request. Further, since cylinder number two is the first cylinder to receive fuel and spark, it may be predicted that cylinder number two will be the first cylinder to combust an air-fuel mixture since engine stop. As such, the engine controller disengages the starter pinion at 312 during the expansion stroke of cylinder number two. In one example, the starter may be disengaged at a predetermined crankshaft position. In another example, the starter may be disengaged when engine speed or change in engine speed exceeds a threshold during the first expansion stroke after the first combustion stroke after engine stop.

A second starter control sequence is illustrated as "STARTER SEQ. 2," this starter control sequence is based on the cylinder positions above it, but during this sequence engine speed or acceleration does not exceed a threshold level until the starter pinion is finally disengaged at 326. The starter may begin to rotate at a first low speed before $T_0$. Since cylinder number two is in a compression stroke at engine stop, fuel is injected into cylinder two in response to an engine start request. As described above, cylinder number two is the first cylinder to receive fuel and spark, and it may be predicted that cylinder number two will be the first cylinder to combust an air-fuel mixture since engine stop. The engine controller disengages the starter pinion at 314, during the expansion stroke of cylinder number two. The starter may be disengaged at a predetermined crankshaft position. At 316, the starter is reengaged to the flywheel by controlling the starter pinion speed to rotate near the engine speed and advancing the pinion to the engine flywheel. In one example, the starter is reengaged when engine speed or acceleration is less than a threshold level. The starter pinion is disengaged at 318 after engine controller predicts that cylinder number one is the second cylinder to combust an air-fuel mixture and after the engine crankshaft reaches a predetermined position in the expansion stroke of cylinder number one. The starter pinion is reengaged to the flywheel at 320 by controlling the starter pinion speed to rotate near the engine speed and advancing the pinion to the engine flywheel. The starter pinion is disengaged at 322 after the engine controller predicts that cylinder number three is the third cylinder to combust an air-fuel mixture and after the engine crankshaft reaches a predetermined position in the expansion stroke of cylinder number three. The starter pinion is reengaged to the flywheel at 324 by controlling the starter pinion speed to rotate near the engine speed and advancing the pinion to the engine flywheel. Finally, the starter pinion is disengaged at 326 after the engine controller predicts that cylinder number four is the fourth cylinder to combust an air-fuel mixture and after the engine crankshaft reaches a predetermined position in the expansion stroke of cylinder number four. The starter is not reengaged because engine speed or acceleration has exceeded a threshold level. In this way, it is possible to engage and disengage the starter pinion during an engine start so that the starter may be disengaged early in a start sequence while at the same time providing additional cranking torque if the engine does not start as expected.

Referring now to FIG. 4, a flow chart of an engine starting routine is shown. At 402, routine 400 judges whether or not an engine start request has been made. An engine start request may be made by an operator or by the engine controller or by another system (e.g., a hybrid powertrain controller). In one embodiment, the engine controller may retrieve engine position from memory. Engine position can be determined at engine stop by tracking engine position after fuel and spark have been deactivated and until the crankshaft is at rest. For embodiments where engine position may not be tracked or monitored during engine stop, engine position can be monitored by way of cam and crankshaft position sensors after a request to start. If an engine start request is present, routine 400 proceeds to 404. Otherwise, routine 400 proceeds to exit.

At 404, routine 400 judges whether or not conditions are met for early starter disengagement. In one embodiment, if the ambient temperature is less than a threshold, the starter may be overrun by the engine before the starter pinion is disengaged. If ambient temperature is greater than the threshold, the starter can be disengaged during a cylinder cycle where it is predicted that the cylinder will combust a first air-fuel mixture since engine stop. Further, barometric pressure may be a condition by which a starter is controlled. For example, if barometric pressure is less than a threshold amount, the engine may be started and the starter may not be disengaged until the engine overruns the starter. If barometric pressure is greater that a threshold the starter may be disengaged during a cycle of a cylinder that is on a first combustion cycle since engine stop. If conditions for early starter disengagement are met, routine 400 proceeds to 406. Otherwise, routine 400 proceeds to 426 where the starter remains engaged until engine speed overruns the starter speed and engine speed exceeds a threshold. Thus, during a first condition the starter can be engaged to rotate the engine from stop and disengaged when engine speed exceeds a threshold. During a second condition, different from the first condition, a first combustion cycle can be predicted in which an air-fuel mixture is combusted and the starter can be disengaged during the predicted first combustion cycle.

At 406, the starter pinion is commanded to a first low speed before the pinion is engaged to the engine flywheel. The low speed may reduce starter pinion and flywheel degradation. In an alternative embodiment, the starter may be engaged at cranking speed. The starter pinion speed may be controlled by modulating the starter voltage or current. After adjusting the starter pinion speed, routine 400 proceeds to 408.

At 408, routine 400 engages the starter pinion to the flywheel. The starter pinion may be engaged to the flywheel by applying a voltage to the starter engagement solenoid. After applying voltage to the engagement solenoid routine 400 proceeds to 410.

At 410, routine 400 judges whether or not the starter pinion has engaged the engine flywheel. In one embodiment, a switch at the end of the engagement solenoid travel may indicate that the pinion has fully engaged the flywheel. If the starter is engaged, routine 400 proceeds to 412. Otherwise, routine 400 returns to 408.

At 412, routine 400 the starter pinion speed may be increased to a second level to start the engine. For example, if the starter pinion is rotated at a first speed to reduce pinion and flywheel degradation, the starter pinion speed can be increased after the starter is engaged to improve engine starting. Routine 400 proceeds from 412 to 414 after any adjustments to starter pinion speed are output.

At 414, engine position is tracked or monitored as the engine begins to rotate. In embodiments where engine position is stored in memory at engine stop, engine position is revised as indication markers on the cam and crankshaft pass engine position sensors. In embodiments where engine position is not stored in memory at engine stop, engine position may be indeterminable until the engine rotates a small amount so that markers on the cam and crankshaft indicate a definitive engine position. Once engine position is established, fuel can begin to be injected to engine cylinders. However, for embodiments where fuel and air are held in a cylinder during engine stop, it can be predicted that the first cylinder to combust an air-fuel mixture will be the cylinder in which fuel was injected prior to engine stop. For example, if engine speed is low and the engine controller injects fuel into cylinder number three because it is expected that the engine will stop during the compression stroke of cylinder number three, it may be predicted that cylinder number three will be the first cylinder after engine stop to combust an air-fuel mixture.

In one embodiment where an air-fuel mixture is not held in a cylinder during engine stop, and where fuel is directly injected to a cylinder, fuel may be first injected to the first cylinder determined to be in a compression stroke if fuel injection can be completed before base spark timing (e.g., base spark timing for a cylinder during a start may be between 10-20 crankshaft angle degrees before top-dead-center compression stroke). If fuel cannot be injected before base spark timing, fuel can be injected to the cylinder next in the order of combustion. In another embodiment where fuel is injected to a cylinder port, the first cylinder to receive fuel may be a cylinder that is determined to be on an intake stroke.

Once the engine controller establishes which cylinder is the first cylinder to receive fuel since engine stop (e.g., by monitoring engine position during an engine stop or by keeping track of which cylinder was first to receive fuel after engine stop), the controller may predict that the cylinder first to receive or hold an air-fuel mixture will be the first cylinder to combust an air-fuel mixture. Likewise, first and subsequent combustion of air-fuel mixtures since engine stop in other cylinders (e.g., the second cylinder to receive fuel since engine stop, the third cylinder to receive fuel since engine stop, and so-on) can be predicted according to engine position and when fuel is injected to the cylinder. And, in a condition where the first predicted cylinder or a subsequent predicted cylinder does not accelerate the engine as expected, the prediction of a first combustion cycle of a cylinder since engine stop advances according to the firing order of the engine. For example, if cylinder number one is predicted to be the first cylinder to combust an air-fuel mixture after engine stop, but the engine does not reach a desired speed or accelerate as expected, then cylinder number three becomes the cylinder next predicted to be on its first combustion cycle. Likewise, other engine cylinders become the predicted cylinder to be on their first combustion cycle as the engine continues to rotate through the engine cycle.

In one embodiment, the strokes of each cylinder may be stored in memory and referenced to a 720 crankshaft degrees (e.g., the duration of a cylinder cycle). For example, for a four cylinder engine, top-dead-center compression for cylinder number one may be referenced to 0 and the expansion stroke identified as between 1 and 180 crankshaft degrees. The exhaust stroke for cylinder number one may be between 181 crankshaft degrees and 360 crankshaft degrees. The intake stroke for cylinder number one may be between 361 and 540 crankshaft degrees. The compression stroke for cylinder number one may be between 541 and 720 or 0. The stroke of other engine cylinders may be likewise stored in memory and referenced to the same 0 to 720 reference. Of course, the stroke of other cylinders will be shifted with respect to the 720 degree window. For example, the crankshaft interval of the expansion stroke of cylinder number one (1-180 degrees) corresponds to the compression stroke of cylinder number three, the intake stroke of cylinder number four, and the exhaust stroke of cylinder number two.

Thus, if engine position at start is first established as 200 degrees, it may be determined cylinder number one is in an exhaust stroke, cylinder number three is in an expansion stroke, cylinder number four is in an compression stroke, and cylinder number two is in a compression stroke. Therefore, if fuel is first injected to cylinder number two because it is on a compression stroke, the engine controller can predict that cylinder number two will be the first cylinder to combust an air-fuel mixture after engine stop. In this way, the first combustion cycle of a cylinder from engine stop in which an air-fuel mixture is combusted may be predicted.

At 416, routine 400 judges whether or not the cylinder predicted to combust and air-fuel mixture is at a predetermined crankshaft angle. In one embodiment, the predetermined crankshaft angle may be a crankshaft angle in the expansion stroke of cylinder predicted to combust an air-fuel mixture. And, the particular angle may be an angle where crankshaft acceleration is expected to be highest. For example, the crankshaft angle may be at or after the crankshaft angle where peak cylinder pressure is expected.

In one embodiment, the starter may be disengaged between 45 and 180 degrees after top-dead-center of the compression stroke of the cylinder predicted to combust an air-fuel mixture. In other words, the starter may be disengaged from 45 to 180 degrees into the expansion stroke of the cylinder predicted to combust an air-fuel mixture.

In another embodiment, the starter may be disengaged during the exhaust stroke of the cylinder predicted to be in a first combust cycle. By disengaging the starter later in the cylinder cycle, the engine has an increased opportunity to reach a desired engine speed or acceleration rate because other cylinders may combust air-fuel mixtures by the time the crankshaft reaches the desired starter disengagement position.

It should be noted that other conditions and combinations of conditions may be combined to determine when the starter pinion is to be disengaged. For example, if the engine rotates to the desired starter pinion disengagement crankshaft angle and the engine speed is below a threshold or has not accelerated as anticipated, the starter pinion may remain engaged until the engine speed or acceleration is above the threshold and a crankshaft angle to disengage the starter pinion of a cylinder predicted to be in a first combustion cycle is reached.

Further, the engine speed at which the starter may be disengaged may be increased as altitude decreases or as barometric pressure increases. Further still, the engine speed at which the starter may be disengaged may be decreased as altitude increase or as barometric pressure decreases.

In one embodiment, during a stop/start re-start the first cylinder air charge is calculated as a function of $PV=mRT$, or $m=PV/(RT)$. Where P can be measured with the MAP or Barometric sensor, as the MAP and cylinder air pressure quickly converge on the atmospheric pressure. T is the cylinder air temperature which is calibrated and calculated as a function of engine coolant temperature. The volume is the trapped air charge volume. If the first firing cylinder is positioned before intake valve closure, IVC, then the volume is determined by the swept volume from IVC to TDC. If the particular engine has a VCT system with the ability to accurately measure the intake CAM position then this can be used to estimate the first cylinder combustion torque as well. This would also apply to the exhaust CAM position as advancing EVO reduces the combustion energy transferred to the piston (e.g., the combustion force/torque). If the first firing cylinder is located after IVC the initial engine position will also affect the trapped air mass, and the resulting torque, which can be measured with the bi-directional Hall, or equivalent, crank position sensor.

If the engine has not reached the position at which the starter pinion may be scheduled to be disengaged for the cylinder of the predicted first combustion cycle or if conditions have not been met to disengage the starter, routine 400 moves to 414. Otherwise, routine 400 moves to 418.

At 418, the starter is disengaged. The starter may be disengaged by removing voltage from the starter engagement solenoid. In addition, current and voltage may be removed from the pinion motor so that the pinion coasts to a stop.

At 420, routine 400 determines whether or not the engine has started. The engine may be determined started when engine speed is greater than a threshold or when an acceleration rate of the engine exceeds a threshold level. If the engine is determined to be started, routine 400 proceeds to exit. Otherwise, routine 400 proceeds to 422.

At 422, routine 400 rotates the starter pinion at a speed to match engine speed. In one example, engine speed can be determined from a crankshaft position sensor and the starter motor can be supplied current at a rate that corresponds to a rotational speed of the starter that matches the engine speed. For example, the present engine speed can be used to index a function that outputs starter motor current as a function of starter speed. In this way, the starter motor current can be supplied to the starter in an open-loop manner such that starter motor or pinion speed does not need to be monitored. After the pinion speed is output, routine 400 proceeds to 424.

At 424, the starter is reengaged with the flywheel. In one example, voltage is applied to the starter solenoid at a predetermined crankshaft angle. For example, the starter pinion may be reengaged before the end of the exhaust stroke of the cylinder predicted to be on a first combustion cycle since engine stop. In another example, the starter pinion may be reengaged before the end of the expansion stroke of the cylinder predicted to be on a first combustion cycle since engine stop. In another example, the starter pinion may be engaged as soon as it is determined that the engine has not started.

Note that the engine position at which the starter is reengaged may be different for different engines. The starter may be reengaged when engine speed or acceleration is less than a threshold level by the time the engine reaches a particular crankshaft position. For example, if the engine speed or acceleration does not increase above a threshold before the end of the expansion stroke of the cylinder predicted to combust an air-fuel mixture, the starter can be reengaged.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine starting method, comprising:
   stopping the engine while fuel and air are held in a cylinder;
   predicting a first cylinder combustion cycle from engine stop in which an air-fuel mixture is combusted in the cylinder holding fuel and air;
   engaging a starter before ignition of the air-fuel mixture; and
   disengaging the starter during an expansion stroke of the predicted first combustion cycle.

2. The method of claim 1, wherein the starter is disengaged in response to engine acceleration exceeding a threshold.

3. The method of claim 1, further comprising injecting fuel to an engine cylinder in response to a request to start the engine.

4. The method of claim 1, further comprising storing a stop position of the engine in memory of a controller.

5. The method of claim 1, further comprising starting the engine via a controller and disengaging the starter in response to peak cylinder pressure.

6. The method of claim 1, wherein the engine is installed in a hybrid vehicle.

7. The method of claim 1, wherein said disengaging of said starter is related to a speed threshold of said engine.

8. The method of claim 7, wherein said speed threshold decreases as altitude increases and increases as altitude decreases.

9. The method of claim 1 wherein during the stopping, injecting fuel into the cylinder because it is expected that the engine will stop during a compression stroke of the cylinder.

10. A method for starting an engine, comprising:
    predicting a first combustion cycle of a cylinder from engine stop in which an air-fuel mixture is combusted;
    starting the engine via engaging a starter;
    directly injecting fuel to the cylinder during a compression stroke if injection is completed before spark timing;
    disengaging the starter during the predicted first combustion cycle; and
    repeatedly re-engaging the starter when a speed of the engine is less than a threshold.

11. The method of claim 10, wherein starting the engine is initiated by a controller.

12. The method of claim 10, wherein a speed of a pinion of said starter is controlled to substantially match engine speed during said re-engaging of said starter.

13. The method of claim 10, further comprising disengaging and re-engaging the starter multiple times with each re-engagement at a time before a next scheduled combustion event in an engine firing order when speed does not reach the speed threshold.

14. The method of claim 10, wherein said speed threshold increases as altitude decreases and decreases as altitude increases.

15. The method of claim 10, further comprising disengaging said starter at a predetermined crankshaft angle during a cycle of a second cylinder, said cycle of said second cylinder during a cylinder cycle that said second cylinder is predicted to combust said air-fuel mixture.

16. The method of claim 10, further comprising tracking engine position via camshaft and crankshaft sensors.

17. An engine starting method, comprising:
- stopping the engine without holding an air-fuel mixture in a cylinder during the engine stop;
- starting the engine;
- predicting a first combustion cycle of a cylinder from engine stop in which an air-fuel mixture is combusted;
- directly injecting fuel to the cylinder in a compression stroke;
- engaging a starter before ignition of the air-fuel mixture; and
- disengaging the starter during an expansion stroke of the predicted first combustion cycle.

18. The method of claim 17, wherein the starter is disengaged in response to engine acceleration exceeding a threshold.

19. The method of claim 17, further comprising storing a stop position of the engine in memory of a controller.

20. The method of claim 17, further comprising starting the engine via a controller and disengaging the starter in response to peak cylinder pressure.

* * * * *